US005122433A

United States Patent [19]

Kawaguchi

[11] Patent Number: 5,122,433

[45] Date of Patent: Jun. 16, 1992

[54] IMAGE RECORDING METHOD

[75] Inventor: Hitoshi Kawaguchi, Kanagawa, Japan

[73] Assignee: Fuji Photo Film Co., Ltd., Kanagawa, Japan

[21] Appl. No.: 366,383

[22] Filed: Jun. 15, 1989

[30] Foreign Application Priority Data

Jun. 15, 1988 [JP] Japan ................................ 63-147843

[51] Int. Cl.[5] .......................... G03C 5/54; G03C 5/04; G03B 27/32

[52] U.S. Cl. ...................................... 430/203; 430/30; 430/202; 430/207; 430/235; 430/236; 430/244; 430/494; 355/27; 354/301

[58] Field of Search ............... 430/202, 203, 207, 244, 430/236, 235.30; 355/27; 354/301

[56] References Cited

U.S. PATENT DOCUMENTS 4,629,675 12/1986 Takehara et al. .................... 430/207
4,660,964 4/1987 Koshikawa et al. .................. 355/28

FOREIGN PATENT DOCUMENTS 0210660 2/1987 European Pat. Off. .
0220746 5/1987 European Pat. Off. .
58-149046 9/1983 Japan .
58-149047 9/1983 Japan .
59-152440 8/1984 Japan .
59-154445 9/1984 Japan .
59-165054 9/1984 Japan .
59-168439 9/1984 Japan .
59-174832 10/1984 Japan .
59-174833 10/1984 Japan .
59-174834 10/1984 Japan .
59-174835 10/1984 Japan .
59-180548 10/1984 Japan .
62-65038 3/1987 Japan .
62-173463 7/1987 Japan .
62-183457 8/1987 Japan .
62-253159 11/1987 Japan .

*Primary Examiner*—Richard L. Schilling
*Attorney, Agent, or Firm*—Sughrue, Mion, Zinn Macpeak & Seas

[57] ABSTRACT

An image recording method, where the image is transferred by superposing an exposed light-sensitive material and an image receiving material on the surface of a drum.

Before superposing, in circumferential direction with respect to the axial direction of the drum reduced or magnified image is exposed onto the light-sensitive material.

When a reduced image has been exposed, the exposed light-sensitive material will be positioned between the image receiving material and the surface of the drum. When a magnified image has been exposed, the image receiving material will be positioned between the exposed light-sensitive material and the surface of the drum. In this way an image without distortions will be transferred.

17 Claims, 1 Drawing Sheet

IMAGE RECORDING METHOD

BACKGROUND OF THE INVENTION

1. Field of the Invention

The present invention relates to a method of recording an image such that the image is exposed on light-sensitive material and then transferred to an image receiving material.

2. Description of the Related Art

Conventional image recording methods are known where an image on a light-sensitive material is exposed using optional exposure systems while the light-sensitive material is conveyed, the light-sensitive material is then superposed on the receiving material and those two materials are wound on the outer periphery of a heating drum, and the image is transferred to the receiving material by way of thermal development.

An image recording apparatus to which this kind of image recording method is applied provides an optical exposure system comprising, for example, a light source, a reflecting mirror and a lens that can be moved along a manuscript. Further, the image recording apparatus comprises conveyor rollers which convey the light-sensitive material to the exposure position.

When exposing an image on, for example, the original film, while emitting light from the light source, the light source and the lens move along the manuscript (that is, the emitted light is irradiated along the manuscript). At the same time, while the light-sensitive material is conveyed at a predetermined speed, reflected image light or transparent image light to the manuscript project upon the light-sensitive material, and the image is exposed on the light-sensitive material. The light-sensitive material on which the image is exposed is then carried to the thermal developing and transferring portion. The thermal developing and transferring portion comprises a heated drum and an endless pressure belt, and the light-sensitive material and the image receiving material are superposed and wound upon outer periphery of the drum. The light-sensitive material and the image receiving material in this superpositioned condition are heated together, heat developed and the image is transferred to the receiving material.

However, when the exposed light-sensitive material and the receiving material are superposed and wound upon the outer periphery of the heat drum as mentioned, the radius of the winding (in other words the radius of the curvature) depends upon the external radius of the drum and the thickness of the materials. The radius differs for the inner material and outer material upon the heat drum. Therefore, upon transfer of an image from the light-sensitive material to the receiving material, when the light-sensitive material is the outer layer, the image obtained after transfer will be smaller than the original exposure. On the other hand, the transferred image will be larger than the original exposure when the light-sensitive material is the inner layer. In either case, there is the problem that an error in transfer ratio appears, and in that is the circumferential direction of the drum a distorted image could be obtained on the image receiving material.

Making the outer radius of the heating drum large and thereby also making the winding radius of each material (upon winding, the radius of curvature) large, namely, making the winding radius difference between the materials small, necessitates large size device.

SUMMARY OF THE INVENTION

The object of the present invention is to obtain an image recording method that avoids large size devices and abolishes the error in transfer ratio on transfer of an image from an exposed light-sensitive material to a receiving material can thereby produce good images without distortion.

In the present invention, when transferring an image by means of superposing, the image receiving material and the exposed light-sensitive material on the surface of a drum, the following steps are required:

(1) Exposing the light-sensitive material with the image reduced or magnified, in the direction corresponding to the circumferential direction of the drum before superposing;

(2) Superposing the exposed light-sensitive material and the image receiving material so as to position the exposed light-sensitive material between the surface of the drum and the image receiving material when a reduced image has been exposed; on Superposing the exposed light-sensitive material and the image receiving material so as to position the image receiving material between the surface of the drum and the light-sensitive material when a magnified image has been exposed; and.

(3) Transferring the image. When transferring the image by of superposing the image receiving material and the exposed light-sensitive material on the surface of the drum with the exposed light-sensitive material between the surface of the drum and the image receiving material, an image with no distortion is transferred as a result of the cancellation of the distortion in the circumferential direction of the drum corresponding to the drum radius by the reduction caused by conducting exposure using an image reduced in the direction corresponding to the circumferential direction of the drum. When transferring the image by superposing the image receiving material and the exposed light-sensitive material on the surface of the drum so as to position the image receiving material between the surface of the drum and the exposed light-sensitive material, an image with no distortion is transferred as a result of the cancellation of the reduction in image size in the circumferential direction of the drum corresponding to the drum radius by the magnification caused during exposure by conducting exposure using an image magnified in the direction corresponding to the circumferential direction of the drum.

During exposure, the light source is moved at a predetermined moving speed, and the light-sensitive material is carried at a predetermined carrying speed, so that an image of the manuscript is irradiated onto the light-sensitive material which can be thus exposed.

In this case, when the light-sensitive material is exterior to the image receiving material relative to the drum, the moving speed of the light source of the optical exposure system may be set at a lower than normal speed, or the transport of the light-sensitive material may be set at higher than normal. When the light-sensitive material is interior of the image receiving material relative to the drum, the moving speed of the light source of the optical exposure system may be set at a higher than normal speed or the transport of the light-sensitive material may be set at a lower than normal speed.

Therefore, when transferring an image with the light-sensitive material positioned exteriorly, an image larger than the original manuscript in the transport direction of the light-sensitive material is exposed on the light-sensitive material. On the other hand, when transferring an image with the light-sensitive material positioned interiorly, an image smaller than the original manuscript in the transport direction of the light-sensitive material is exposed on the light-sensitive material. Consequently, in any case where transfer is performed by winding the two materials around the heated drum, the error in the transfer ratio will be corrected, so that on the image receiving material a good and distortion free image will be obtained.

In view of the above, the present invention provides a superior image recording method which provides good images and that transfers the image exposed onto a light-sensitive material to an image receiving material, by abolishing a transfer ratio error without necessitating an increase in the size of the device.

References are listed below which describe in detail light-sensitive materials and image receiving materials that may actually be applied in the present invention: U.S. Pat. Nos. 4,463,079, 4,474,867, 4,478,927, 4,507,380, 4,500,626, 4,483,914 and 4,740,445, Japanese Patent Application Laid Open Nos. 58-149046, 58-149047, 59-152440, 59-154445, 59-165054, 59-180548, 59-168439, 59-174832, 59-174833, 59-174834, 59-174835, 62-65038, 62-253159, 62-173463 and 62-183457 and European Patent Application Publications 210,660A2 and 220,746A2.

DESCRIPTION OF THE PREFERRED EMBODIMENTS

Figure 1:
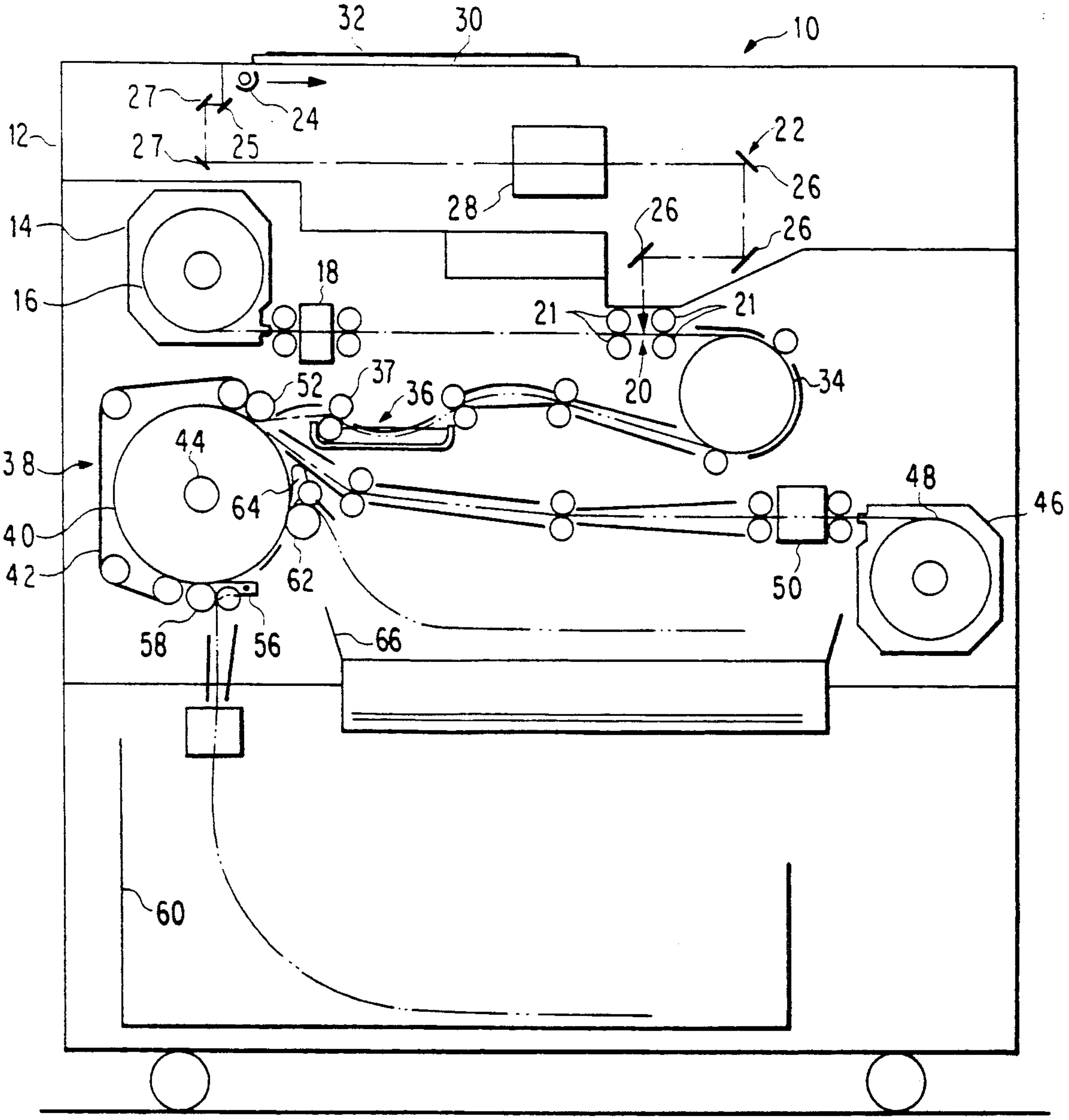
FIG. 1 is a schematic view of an image recording apparatus using the image recording method of the present invention.

FIG. 1 is a schematic view of an image recording apparatus 10 constructed according to the present invention.

The image recording apparatus 10 has a magazine for light sensitive material 14 arranged inside a frame 12. The magazine holds a light-sensitive material 16 wound in roll form.

Adjoining the light-sensitive material magazine 14 is a cutter 18 arranged to cut the light-sensitive material 16 to a fixed length when it is pulled out from the magazine 14. The cut sheet 16 is then carried to the exposure portion 20.

In the exposure section 20 are conveyor rollers 21 arranged to carry the light-sensitive material 16 through the exposure portion 20. The conveyor rollers 21 are constructed so as to pass the light-sensitive material 16 through the exposure portion 20 at a fixed carrying speed.

An exposure device 22 for the optical exposure system is provided above the exposure portion 20. The exposure device 22 is comprised a movable light source 24, a plurality of fixed mirrors 26, a plurality of movable mirrors 25, 27 and a movable lens unit 28. A platen glass 30 is provided on top of frame 12 above these parts. The light source 24 and the movable mirror 25 are constructed so as to be movable as a unit along the platen glass 30 so that the light emitted from the light source 24 directly irradiates the manuscript 32. During exposure, while moving the light source 24 and the movable mirrors 25, 27, the emitted light irradiates the manuscript 32. The reflected light image passes through the lens unit 28 onto the light-sensitive material 16 in the exposure portion 20. In exposure, the position of lens unit 28 and the moving speed of the light source 24 and the movable mirrors 25, 27 are determined in the following way. The position of lens unit 28 is determined by the magnification or reduction ratio of the image. That is to say, when the reproduction ratio is large, the lens unit 28 will be positioned near the movable mirrors 27. When the reproduction ratio is small, the lens unit 28 will be positioned near the fixed mirror 26. Therefore, the image with which the light-sensitive material is exposed may be magnified, reduced or left as it is. The magnification or reduction referred to here is of course proportional, i.e., it occurs in both planar dimensions, whereas the corrective magnification or reduction of the invention is uniaxial in nature.

The moving speed V of the light source 24, when the transport speed of the light-sensitive material 16 is Vo and the reproduction ratio is m, is given by the equation $V = Vo/m - \alpha$. The $\alpha$ is a positive value correcting the error in the reproduction ratio.

The correction value $\alpha$ is determined by the outer radius of the heated drum 40, the thickness of each of the light-sensitive material 16 and image receiving material 48 and the position of superposing the image receiving material 48. Thus when the thickness of the material is kept constant, the correction value $\alpha$ becomes smaller with increasing outer radius of the drum 40. Consequently, when the superpositioned image receiving material occupies an inner position as in the device shown in the figure, the light source 24 will move slower than the moving speed Vo/m determined by the reproduction ratio. Movable mirror 25 moves in unison with the light source 24, so that its moving speed will be equal to that of light source 24.

Further, the moving speed of movable mirror 27 is half that of light source 24. Therefore, independent of the position of the light source 24 and the mirror 27, the optical path length from the manuscript 32 to the light-sensitive material 16 will always be constant. As stated above, by moving light source 24 and the movable mirror 25 at a speed slower than that determined by the reproduction ratio, a magnified image will be exposed onto light-sensitive material 16 in the transport direction of the light-sensitive material 16.

In a direction downstream from the exposure section 20 is an inventing roller 34 and downstream further from roller 34 a water applicator 36 is arranged. The light-sensitive material 16 on which an image has been exposed at the exposure section 20 is thus inverted around roller 34 and coated with water as a solvent for developing the image at water applicator 36.

At water applicator 36 a squeeze roller 37 is arranged for removing excess water from coated light-sensitive material 16.

Downstream from squeeze roller 37, a thermal developing and transferring portion 38 is arranged. The thermal developing and transferring portion 38 comprises a heated drum 40 and an endless pressure belt 42.

The surface of the drum 40 is coated with teflon. Further, the drum 40 has a halogen lamp 44 arranged therein so as to heat the outer surface of the drum 40 to about 90 degrees celsius.

The endless pressure belt 42 is comprised of a heat resistant material such as an aromatic polyamide fiber (for example: KEBRA or NORMETHOX, both registered trademarks of Du Pont Co.) covered by a silicon gum containing carbon, and is conductive.

On the side of the frame 12 opposite the magazine 14 is arranged a receiving material magazine 46 which contains the image receiving material 48 wound in roll form.

Adjoining the receiving material magazine 46 is disposed a cutter 50. The image receiving material 48 is cut to a fixed length by the cutter 50 when pulled from magazine 46. The image receiving material 48 so cut is carried to the thermal developing and transferring portion 38.

Arranged upstream from the endless pressure belt 42 in the material supply direction, adjoining the drum 40, is a laminating roller 52.

The laminating roller 52 supexposes the light-sensitive material 16 and the image receiving material 48 and presses the two materials as to the outer periphery of the drum 40. The laminating roller 52 feeds the two materials and guides them between the endless pressure belt 42 and the heated drum 40, while superposing them.

The exposed light-sensitive material 16 is superpositioned upon the image receiving material 48 by the laminating roller 52 and wound around drum 40. The material 16 is pinched and transported about ⅝ of a turn around the drum 40 between drum 40 and the endless pressure belt 42 thereby being thermally developed. And the image is transferred to image receiving material 48.

Because the endless pressure belt 42 is conductive, the build-up of static electricity due to friction between drum 40, belt 42, and materials 16, 48 is prevented.

A separation pawl 56 is arranged at the lower portion of the drum 40 downstream from the material supply direction of the endless pressure belt 42. A separation roller 58 is arranged between separation pawl 56 and endless pressure belt 42.

Normally, the tip of separation pawl 56 is in contact with the drum 40. When light-sensitive material 16 is carried by the drum, the separation pawl 56 engages the end of the light-sensitive material 16, divides the light-sensitive material 16 from the image receiving material 48 and separates the light-sensitive material 16 from the outer circumference of drum 40. In addition, separation rollers 58 press against the light-sensitive material 16 on the drum 40 and guide the separated light-sensitive material 16 while bending it in the downward direction. The separated light-sensitive material 16 is transported into a waste accommodating box 60 provided below the drum 40.

Separation rollers 62 and a separation pawl 64 are arranged adjoining the drum 40 above the separation pawl 56. These are for separating from the outer periphery of the heated drum 40 the image receiving material 48 which is still moving with the drum, after the light-sensitive material 16 has been separated. The image receiving material 48 separated from the outer periphery of the drum 40 is accumulated on tray 66.

The following is a description of the operation of this embodiment.

The light-sensitive material 16 having been pulled out from the sensitive material magazine 14 is cut by cutter 18 and carried to exposure portion 20.

Here, the exposure device 22 operates to move the light source 24 and the movable mirror 27 to irradiate the manuscript 32 which is positioned upon the platen glass 30. Further, while the light-sensitive material 16 is carried at a fixed speed and passed through exposure portion 20 by the driving of the conveyor rollers 21 the reflected image of the manuscript 32 is irradiated onto the light-sensitive material 16 through lens unit 28.

The moving speed of the light source 24 and the movable mirror 27, as explained above, is set at a speed so as to correct the error in transfer ratio. An image magnified in the conveying direction of the light-sensitive material 16, is exposed on the light-sensitive material 16 which passes at a predetermined carrying speed (constant velocity) through the exposure portion 20.

The exposed light-sensitive material 16 is inventing by a inversion roller 34, and coated with water as developing solvent in water coating portion 36. Additionally, after excess water has been removed by squeeze rollers 37, the light-sensitive material 16 is carried on to thermal developing and transferring portion 38.

The image receiving material 48 is also carried to the thermal developing and transferring portion 38 after it has been pulled out from the receiving material magazine 46 and cut to a fixed length by cutter 50.

At the entrance side of thermal developing and transferring portion 38, laminating rollers 52 are arranged upstream in the material supply direction of the endless pressure belt 42, and adjoin drum 40. The light-sensitive material 16 and the image receiving material 48 are supplied together to laminating rollers 52.

The light-sensitive material 16 and the image receiving material 48 supplied to the laminating rollers 52 are evenly superpositioned by the laminating rollers 52. In this superpositioned state the materials are guided to feed into the space between the heating drum 40 and the endless pressure belt 42.

In the thermal developing and transferring portion 38 (between heating drum 40 and endless pressure belt 52) the light-sensitive material 16 and the image receiving material 48, in a superimposed state, are heated and thermally developed. The image is transferred and forms an image on the image receiving material 48.

The conductive endless belt, prevents the build-up of static electricity due to friction and in addition prevents fogging of the image receiving material 48 due to spark discharge.

In the prior art, the winding around the heating drum 40 creates a transfer ratio error. When the light-sensitive material 16 is positioned exteriorly with respect to the image receiving material 48 on the drum 40, a smaller image than the original manuscript 32 is transferred to the light-sensitive material 16. However, in the present embodiment, because the image is magnified in the transport direction of the light-sensitive material 16, that is, in the circumferential direction of the drum 40, when exposed on the light-sensitive material 16, the transfer ratio error will be corrected. An image equal to the size of manuscript 32 or an analogue image will be transferred onto the image receiving material 48, so that a good image without distortion will be obtained. When the light-sensitive material 16 and the image receiving material 48 are pinched together and transported to reach the lower part of drum 40, the separation pawl 56 engages the end of the light-sensitive material 16, separates the light-sensitive material 16 from the image receiving material 48 and peels the material 16 from the outer circumference of the drum 40. In conjunction therewith, the separation rollers 58 press the light-sensitive material 16 against the drum 40, and guide the light-sensitive material 16 that has been peeled off by the separation pawl 56 in a downward direction.

The separated light-sensitive material 16 is then collected in waste collection box 60 provided below the drum 40.

The image receiving material 48 that is still moving with drum 40 after the light-sensitive material 16 has been separated, is peeled off the outer circumference of the heating drum 40 by the separation rollers 62 and the separation pawl 64 and accumulated in tray 66.

In this way, by considering the magnitude of the transfer ratio error a properly sized image of the manuscript 32 will be exposed on the light-sensitive material 16, thereby transferring an image similar to or resembling the size of the manuscript 32 onto the image receiving material 48 which is wrapped around drum 40. This effect is obtainable despite the curvature of the drum 40, making it possible to obtain a good image that is free of distortion. By reducing the outer radius of the heating drum 40, it is possible to minimize the size of the device. The present embodiment is characterized in that the moving speed the light source 24 and the movable mirror 27 (that is the exposure speed) can be set at a (slower than usual) fixed speed thereby providing correction of the transfer ratio error. However, the device can be constructed so that the carrying speed of the light-sensitive material 16, which is determined by the rollers 21 and proportional to the transit time through exposure portion 20, can be set so as to correct the transfer ratio error. That is, with the moving speed V of the light source 24 kept constant, the carrying speed of the light-sensitive material 16 Vo might be changed to $mV+\alpha$. Additionally, the construction can be such that the relative speed between the two aforementioned items can be set so as to correct the transfer ratio error.

Furthermore, as has been explained, the present embodiment is characterized by a construction where the light-sensitive material 16 is positioned exteriorly on heating drum 40 with respect to the image receiving material 48. However, the present invention is not limited to this construction. An application is also feasible where the light-sensitive material 16 is positioned on the interior side of the heating drum 40 with respect to the image receiving material 48.

In this case, the moving speed of the light source 24 and the movable mirror 25 of the optical exposure system can be set faster ($V=Vo/m+\alpha$) or the carrying speed of the light-sensitive material 16 by the rollers 21 can be set slower ($Vo=mV-\alpha$). Consequently, an image reduced in the carrying direction, will be exposed on the light-sensitive material 16. In this case, also when wound around the drum 40, in the prior art, an error in transfer ratio was created and an image magnified in carrying direction was transferred to the image receiving material 48. By considering the error in transfer ratio, and exposing onto the light-sensitive material 16, an image reduced in the carrying direction, the image transferred to the image receiving material 48 is always equal to or resembles the original manuscript 32, so that a good image free of distortion can be obtained.

As was explained, the present embodiment is characterized by an apparatus for image recording 10 constructed in such a way that the light from the light source 24 directly irradiates the manuscript 32. However, the present invention is not limited to this.

The present invention is applicable to a device where a laser beam is used to expose or write image information on light-sensitive material that is being transported. The invention could also be applied to image recording devices using an exposure head formed of an LED array or the like, where the light-sensitive material is wound around a rotating drum and the exposure head is operated in accordance with the pictural information in order to expose an image.

Further, although the invention has been explained with respect to the use of reflective manuscripts, it could also be applied in devices using transparent manuscripts. Additionally, in place of reducing or magnifying the image by changing the transport speed, an optical system for reduction or magnification of the image could also be used.

What is claimed is:

1. An image recording method wherein an image which is subjected to one of proportional reduction in both planar dimensions, proportional magnification in both planar dimensions, and duplication at the same size, is exposed on a light-sensitive material and said image is transferred to an image receiving material by superposing said exposed light-sensitive material and said image receiving material on a surface of a drum, comprising the steps of:

(a) performing one of (i) exposing said image on said light-sensitive material such that said image exposed on said light-sensitive material is subjected to a reduction in the dimension along the circumference of the drum before conducting said superposition when said light-sensitive material is positioned between the surface of said drum and said image receiving material, and (ii) exposing said image on said light sensitive material such that said image exposed on said light-sensitive material is subjected to a magnification in the dimension along the circumference of the drum before conducting said superposition when said image receiving material is positioned between the surface of said drum and said light-sensitive material; and (b) conducting said superposition of said light-sensitive material and image receiving material on the surface of the drum, and conducting said transfer of said image on said light-sensitive material.

2. An image recording method according to claim 1, wherein a light source is moved at a predetermined moving speed with respect to a manuscript in conjunction with the light-sensitive material being carried at a predetermined speed thereby projecting an image of the manuscript onto said light-sensitive material and exposing it.

3. An image recording method according to claim 2, wherein one of (a) moving said light source at a faster rate than said predetermined moving speed, and (b) carrying said light-sensitive material at a slower rate than said predetermined carrying speed, is preformed, thereby exposing a reduced image in the dimension along the circumference of the drum.

4. An image recording method according to claim 2, wherein one of (a) moving said light source at a slower rate than said predetermined moving speed, and (b) carrying said light-sensitive material at a faster rate than said predetermined carrying speed, is performed, thereby exposing a magnified image in the dimension along the circumference of the drum.

5. An image recording method according to claim 3, wherein the predetermined moving speed of said light source is set so as to become slower in proportion to an increase in the magnification of the image produced on said image receiving material to the size of the manuscript image.

6. An image recording method according to claim 4, wherein the predetermined moving speed of said light source is set so as to become slower in proportion to an increase in the magnification of the image produced on said image receiving material to the size of the manuscript image.

7. An image recording method according to claim 3, wherein one of an increase in the moving speed of said light source and a decrease in the carrying speed of said light-sensitive material is proportionally increased as the size of the drum is decreased.

8. An image recording method according to claim 4, wherein one of an decreased in the moving speed of said light source and an increase in the carrying speed of said light-sensitive material is proportionally increased as the size of the drum is decreased.

9. An image recording method, comprising the steps of:

carrying a light-sensitive material at a predetermined carrying speed, moving a light source with respect to a manuscript at a speed faster than the speed of said light source as determined by a magnification of the image on an image receiving material from the manuscript image, and said predetermined carrying speed of said light sensitive material, and determining the position of a lens unit disposed between the manuscript and the light-sensitive material in accordance with said magnification.

thereby, exposing on said light-sensitive material an image to be reduced in a dimension along the circumference of the drum with a magnification which is smaller than the magnification on said image receiving material;

(b) superposing in close contact with a surface of said drum said light sensitive material and the image receiving material wherein said light-sensitive material is positioned between the surface of said drum and said image receiving material; and (c) thermal developing said light-sensitive material and transferring the image of said light-sensitive material to said image receiving material.

10. An image recording method according to claim 9, wherein the moving speed of said light source is increased as the size of the drum is decreased.

11. An image recording method according to claim 9, wherein said moving speed is determined by a ratio of said predetermined carrying speed and said magnification of the image.

12. An image recording method, comprising the steps of:

(a) carrying a light-sensitive material at a predetermined carrying speed, moving a light source with respect to a manuscript at a speed slower than the speed of said light source as determined by a magnification of the image on an image receiving material from the manuscript image, and said predetermined carrying speed of said light sensitive material, determining the position of a lens unit disposed between the manuscript and the light-sensitive material in accordance with said magnification.

thereby, exposing on said light-sensitive material an image to be magnified in the dimension along the circumference of the drum with a magnification which is smaller than the magnification on said image receiving material;

(b) superposing in close contact with a surface of said drum said light-sensitive material and the image receiving material wherein said image receiving material is positioned between the surface of said drum and said light-sensitive material; and (c) thermal developing said light-sensitive material and transferring the image of said light-sensitive material to said image receiving material.

13. A image recording method according to claim 12, wherein a decrease in the moving speed of said light source is increased as the size of the drum is decreased.

14. An image recording method according to claim 12, wherein said moving speed is determined by a ratio of said predetermined carrying speed and said magnification of the image.

15. An image recording method, comprising the steps of:

(a) transporting a light-sensitive material to an exposure location;

(b) exposing said light-sensitive material to an image of an original while transporting said light-sensitive material through said exposure location;

(c) subsequently transporting said light-sensitive material onto the surface of a drum, where it is superposed with an image receiving material, for transferring the image recorded on said light-sensitive material to said image receiving material;

wherein when said light-sensitive material is to be positioned between the surface of said drum and said image receiving material, said exposing step is conducted so as to reduce the size of the exposed image in the transport direction of said light-sensitive material; and when said image receiving material is to be positioned between the surface of said drum and said light sensitive material, said exposing step is conducted so as to magnify the size of the exposed image in the transport direction of said light sensitive material.

16. A method as claimed in claim 15, wherein when said exposing step is conducted so as to reduce the size of the exposed image, in the transport direction, said exposing step comprises at least one of:

(a) moving an exposing light source at a faster than normal speed during exposure, and (b) transporting said light-sensitive material through said exposure location at a slower than normal speed.

17. A method as claimed in claim 15, wherein when said exposing step is conducted so as to magnify the size of the exposed image in the transport direction, said exposing step comprises at least one of:

(a) moving an exposing light source at a slower than normal speed during exposure, and (b) transporting said light-sensitive material through said exposure location at a faster than normal speed.

* * * * *